Patented Dec. 17, 1940

2,225,161

UNITED STATES PATENT OFFICE 2,225,161

GLAZE FOR DECORATING GLASSWARE

Alden J. Deyrup, Elizabeth, N. J., assignor to E. I. du Pont de Nemours & Company, Wilmington, Del., a corporation of Delaware No Drawing. Application March 23, 1937, Serial No. 132,660

8 Claims. (Cl. 106—36.2)

This invention relates to the decoration of the surfaces of ceramic ware by the use of low melting glazes which may be pigmented and/or opacified. Although generally useful in the decoration of various ceramic surfaces, the invention is especially useful for the decoration of the surfaces of glassware articles.

When glassware surfaces are to be decorated by melting thereon a glaze composition, which may or may not be pigmented by the addition of a ceramic pigment, it is essential that the decorative glaze shall melt and form an adherent coating at a temperature below that at which softening or deformation of the glass article would occur. It is in this special field of low melting glazes, enamels melting in general below 1100° F., that the novel compositions with which this invention is concerned find their principal utility.

The art of decorating glassware by the application thereto of a low melting glass composition, usually termed a "glaze," has been practiced for a number of years. In order to insure melting of the glaze composition below about 1100° F. it has been usual to employ lead borosilicate as the low melting glaze. At temperatures above 1100° F., such as 1200° F., or temperatures of 1150° F. or over, the danger of injury to the glass article decorated by softening or deformation is very great. The low melting borosilicates of lead are usually prepared by melting together an oxide of lead, boric acid, and silica in such proportions as to yield a glaze having a suitable low melting point. Such glazes are now, and have been for some time, in commercial use for decorating glassware.

While the presence of boron in these glaze compositions, the boron being introduced as boric oxide or some compound yielding boric oxide such as boric acid, has been desirable from the point of view of lowering the melting point, the inclusion of boric acid has, in general, greatly lessened the resistance to acids and alkalies of the glaze compositions and resulting glossy decorative surface. Various attempts have been made to secure a glaze composition which would possess a satisfactory low melting point but which would nevertheless have greater resistance to the action of acids and alkalies. In general, it has been necessary to sacrifice melting point for increased resistance. If the glazes are to be rendered more resistant to the action of acids and alkalies, it has generally been necessary to prepare compositions with relatively high melting points, the melting points being so high in some cases as to preclude utilization of these glaze compositions for decorating the surfaces of glassware. Some of the lead borosilicate glazes of low melting point, on the other hand, are soluble to a substantial extent even in water.

Some of the glaze compositions now known to the art have contained alkali metal oxides, such as oxides of sodium, potassium and lithium, in conjunction with other ingredients such as lead oxide, silica, and boric oxide. While the inclusion of the alkali metal oxides has resulted in lowering the melting point of the glaze compositions somewhat, it has also rendered the resulting glazes less resistant to the action of chemical agents. Previously, it has not been possible to prepare glazes for forming glossy enamel surfaces on glassware to be decorated which could be melted at a temperature below that at which softening or deformation of the glassware article occurs, without the inclusion of either boric oxide (or boric acid), or one or more alkali metal oxides. In order to obtain the desired low melting point it was necessary to sacrifice resistance to some extent. As a result, it has not been generally possible to decorate glassware which is to be used for containing food products, as acids or alkalies present in many food products generally attack the glazes now known to the art to a greater or less extent. This results in the formation of toxic products injurious to those using the articles.

This invention is concerned with a glaze composition which contains no boric oxide but which nevertheless has a melting point low enough to permit its application to glassware. By the inclusion of titanium dioxide in my novel glaze compositions the resistance of the glazes to compositions chemical action has been greatly increased, this result being attained, surprisingly enough, without undue increase in the melting points of the compositions.

Accordingly, one object of this invention is to prepare resistant, low melting glaze compositions consisting principally of silica, lead oxide and titanium dioxide, which compositions do not contain boric oxide. By the elimination of boric oxide the resistance of the glazes to chemical action is greatly increased.

Another object of this invention is to increase, still further, the resistance of the novel improved low melting glazes to the action of chemical agents by the inclusion therein of titanium dioxide as an ingredient of the flux. It has been found that titanium dioxide can be incorporated in a glaze composition consisting largely of lead oxide and silica, and which may or may not contain an alkali metal dioxide such as the oxides of sodium, potassium or lithium, without unduly increasing the melting points of the glazes.

It is, moreover, still another object of this invention to include in a glaze composition containing no boric acid or boric oxide, oxides of the alkali metals such as oxides of sodium, potassium and lithium, thereby obtaining lowering of the fusing point. Because of the inclusion of titanium dioxide as an ingredient in my novel glaze compositions, the oxides of the alkali metals may be included without lowering the resistance of the glazes to the action of chemical agents.

By the elimination of boric oxide, therefore, the resistance of the glazes to chemical action has been greatly increased. By the inclusion of alkali metal oxides the melting point has been lowered without, however, decreasing to too great an extent, the resistance of the enamels to chemical action. And, by the incorporation of titanium dioxide, as an ingredient in my novel glazes containing lead oxide and silica, the resistance of these glazes to chemical action has been very greatly increased without, however, raising the melting point beyond that temperature, about 1100° F., at which softening or deformation of the glass article might occur when the compositions are used for decorating glassware. The improved glazes prepared in accordance with these principles possess a resistance to the action of acids and alkalies which, in some instances, is two hundred and fifty times that of glazes now known to the art. This very important and significant increase in resistance to chemical action has been accomplished without elevating the melting points of the compositions to such a degree as to render them unsuitable for application to articles of glassware.

In order that the general art of decorating glassware may be apparent, it may be said that the glaze composition, which may or may not contain a suitable ceramic pigment, is ordinarily first ground to a finely divided or comminuted state and then suspended in a suitable vehicle. Suspended in this vehicle it is applied to the glassware surface to be decorated by procedures well known to the art, such as by brushing, spraying or printing. When the surface of the glass is uniformly coated with the finely divided glaze composition the ware is fired, the temperature usually being maintained within the limits 1000 to 1100° F. for from five to twenty minutes. The vehicle is removed without interfering with the formation of a glossy, adherent, decorative coating, and the glaze composition melts to a uniform adherent surface. It is essential that the temperature be maintained at least below 1150° F. as at temperatures of 1150° F. or higher softening or deformation of the glassware article will usually occur. The precise temperature at which injury to the ware by softening or deformation occurs depends largely on the character of the glassware article decorated, as articles formed of relatively thick glass, such as milk bottles, may be subjected to somewhat higher temperatures without danger of injury than the relatively thin glass articles such as the drinking glasses. Upon cooling, the glaze composition, which has been melted on the glassware article, forms an adherent decorative coating. This coating may be one that has been tinted or opacified by the introduction of ceramic pigments or opacifiers into the original glaze composition. The coating may be glossy, matte or semi-glossed, as desired, and the character of the coating is determined by the tinting and/or opacifying ingredients present in my basic lead oxide-silica-titanium dioxide glaze.

I have found that my novel acid and alkali resistant glazes of superior resistance properties can be prepared by melting together with titanium dioxide a batch consisting of compounds of lead and silicon adapted to yield the oxides on melting. The batch may or may not contain alkali metal oxides. The melting must be carried out at such a temperature that the titanium dioxide is completely dispersed and melted into the glaze, thereby forming a part of the homogeneous flux composition obtained as a result of the melting operation. Temperatures of approximately 2000° F. will be found suitable to melt all ingredients to a homogeneous flux.

In preparing my novel glazes of improved resistance, the customary practice of melting the glaze and pouring it into water in order that it may solidify in finely divided form may be followed. In melting together the components, definite conditions as to temperature and time need not be maintained. It is only necessary to bring the batch mixture to its melting point and hold this temperature for a period of time sufficient to permit the components to react and form a molten glaze which is reasonably free from bubbles. As now understood, bubbles are frequently due to the decomposition of constituents in the molten glaze. The molten glaze should be heated for a time sufficiently long to eliminate any bubbles which may be formed. This may be from five to twenty minutes.

While the molten glaze is usually poured into water in ordinary fritting operations, the melt can also be poured out upon any convenient clean surface. After pouring, it may be crushed and ground or otherwise disintegrated in accordance with any suitable known procedure. In use, either with or without the addition by milling or grinding of a ceramic pigment or of an opacifying agent, it may be suspended in a vehicle as previously described and applied to the glassware article to be decorated.

The general composition of my novel glazes of improved resistance to chemical action, but which nevertheless possess melting points suitably low to permit of their application to glassware, may be represented by the following general formula:

| | Per cent |
|---|---|
| PbO | 55–80 |
| $SiO_2$ | 15–35 |
| $TiO_2$ | 2– 7 |
| $R_2O$ | 0–10 |

In this formula, $R_2O$ represents an alkali metal oxide of one or more alkali metal oxides such as the oxides of sodium, potassium and lithium. The percentages are by weight, based on the total weight of the melted frit, and the composition given is the calculated composition.

Various batches may be utilized for preparing glazes having compositions falling within these limits and three typical batches are specified below:

*Batch A*

| | Per cent |
|---|---|
| Red lead | 60 |
| Flint | 29 |
| Soda ash | 8 |
| Titanium dioxide | 3 |

*Batch B*

| | Per cent |
|---|---|
| Red lead | 71 |
| Flint | 21 |
| Soda ash | 2 |
| Titanium dioxide | 4 |
| Ferric oxide | 2 |

Batch C

| | Per cent |
|---|---|
| Red lead | 76 |
| Flint | 19 |
| Titanium dioxide | 5 |

When these batches are melted in accordance with the usual procedure previously described, there will be obtained glazes having the following calculated compositions:

Calculated compositions

| | Batch A | Batch B | Batch C |
|---|---|---|---|
| | Percent | Percent | Percent |
| PbO | 61 | 72 | 76 |
| $SiO_2$ | 31 | 21 | 19 |
| $Na_2O$ | | 1.5 | |
| $TiO_2$ | 5 | 3.5 | 5 |
| $Fe_2O_3$ | 3 | 2 | |

As previously specified, all these percentages are by weight based on the total weight of the melted frit. The iron oxide constituent in Batch B functions principally as a ceramic pigment and may be present without deleteriously affecting the frit or the character of the resulting glaze.

The very superior resistance of my improved glaze compositions, as compared with those now known to the art, and with those disclosed in my co-pending application, S. N. 131,528, filed March 17, 1937, are illustrated in the following table. In this table the value given in the first column represents the number of milligrams of lead dissolved per sq. in. of glazed surface, when that surface is decorated with the old type of lead borosilicate glaze consisting substantially entirely of lead oxide, boric oxide and silica. The value given in the second column represents the number of milligrams of lead dissolved per sq. in. of glazed surface when that surface is decorated with the type of glaze containing boric oxide, lead oxide, silica and titanium oxide disclosed in my co-pending application referred to above. The value given in the third column is the number of milligrams of lead per sq. in. of decorated surface dissolved from a surface decorated with the glazes disclosed and claimed herein. In each instance, the glaze surface is exposed to a 5% solution of acetic acid for a period of one hour at room temperature.

Amounts of lead dissolved by the action of 5% acetic acid

| Glassware surface decorated with old type lead borosilicate ($PbO.B_2O_3.SiO_2$) | Glassware surface decorated with glazes of co-pending application ($PbO.B_2O_3.SiO_2.TiO_2$) | Glassware surface decorated with glazes prepared in accordance with this invention ($PbO.SiO_2.TiO_2.R_2O$) |
|---|---|---|
| Milligrams per sq. in. 50 to 75 | Milligrams per sq. in. 4 | Milligram per sq. in. 0.3 |

In this table $R_2O$ represents an alkali metal oxide such as the oxides of sodium, potassium, and lithium or any mixture of these oxides. As previously explained it may be omitted if desired from my improved glazes.

It may be noted that the 50 to 75 milligrams per sq. in. of lead dissolved from the old type lead borosilicate glazes represents at least 99% of the lead in the glaze. Since the quantity of lead dissolved is an index of the resistance of the glaze, it may be said that the old types of lead borosilicate glazes are substantially completely destroyed by the action of 5% acetic acid at room temperature for one hour. Those glazes covered by my co-pending application are from 12 to 19 times more resistant than the glazes now known to the art, whereas the glazes with which this application is concerned, are very markedly more resistant than the old glazes, being about 165 to 250 times more resistant.

When the novel glazes with which this application is concerned are subjected to the action of a 5% caustic soda solution at 180° F. for one hour they show practically no change when removed from that solution. On the other hand, the lead borosilicate glazes now known to the art, consisting essentially of $PbO.B_2O_3.SiO_2$, are totally removed from the glassware article decorated when subjected to the action of caustic of this concentration for the period specified at a temperature of 180° F. As contrasted with the colors disclosed in this application, those disclosed in my co-pending application previously referred to are somewhat impaired in gloss and their color is somewhat faded by the action of caustic soda for one hour at the temperature specified.

It is obvious, therefore, that my novel and improved glazes are not only very much superior in resistance to the action of both acids and alkalies than any glazes now known to the art or previously prepared, but also that this increased resistivity to chemical action is secured without increasing the melting point of the composition to such an extent as to render the compositions unfit for application to glassware articles. This superior resistance, without elevation of the melting point, has been secured by eliminating an undesirable ingredient, boric oxide, from these glaze compositions, at the same time including, if desired, an alkali metal oxide or a mixture of alkali metal oxides such as the oxides of sodium, potassium, or lithium. While the inclusion of an alkali metal oxide is desirable because it tends to lower the melting point, its presence has generally been regarded as objectionable in the glazes known to the prior art because it was understood to lower the resistance of the old glazes to chemical action. Surprisingly enough, I have found that it can be safely incorporated in my novel glaze compositions without destruction or impairment of the extremely high resistance to chemical action characteristic of my improved frits.

These glaze compositions, or frits, possess a resistance never before secured in low-melting glaze compositions and are characterized by the inclusion as an ingredient in the flux of titanium dioxide. The titanium dioxide is melted-in with the other ingredients comprising the glaze. It is indeed surprising that titanium dioxide could be included in such glaze compositions without elevating their melting points to such an extent as to render them unsuitable for application to glassware, as titanium dioxide is more or less regarded as a refractory oxide. Thus far, its use for decorating has been limited to enamels intended for application to metals, which enamels normally possess fusing points of at least 1450° F. Prior to the discoveries disclosed in this application, and in my co-pending applications, S. N. 131,528 filed March 17, 1937; and S. N. 131,529 filed March 17, 1937; it had been considered impossible to include titanium dioxide as an ingredient in low-melting glaze compositions, melting it in with the glaze. While it had been used to some extent as an opacifier it had proven generally uncertain or unsatisfactory because of the generally unpredictable, usually yellowish, coloration that it imparted to the glaze. It was regarded as useful only in enamels utilized for enameling metal surfaces as, for example, the fluorine-free metal enamels. It is indeed surprising that the inclusion of titanium oxide in low-melting glaze compositions does not elevate the melting point to an undesirable degree, and it is also unpredictable that low melting glaze compositions containing titanium dioxide may be secured without the inclusion therein of boric oxide.

In selecting raw materials to be utilized for making my improved glaze compositions, a wide variety of chemical compounds may be employed to secure the elements indicated in the calculated flux composition. The necessary lead oxide may be obtained from various lead compounds such as litharge, red lead, lead nitrate or similar lead compounds. If desired, two or more lead compounds in any desired proportion may be utilized to supply the requisite lead oxide content. The silica may be secured from sand, flint or other convenient source or combination of sources. Titanium dioxide of the paint pigment grade may be used with complete success.

Any well-known ceramic pigment or opacifier may be introduced into my improved glazes in accordance with known methods, such as by milling or grinding. Examples of suitable white pigments or opacifying agents are titanium dioxide and lead molybdate. Other pigments which can be melted in with the frit or melted in with the raw material batch are cadmium sulphide, iron oxide, cobalt aluminate, cobalt oxide and lead chromate. The exact proportion of pigments to be incorporated in the glaze depends chiefly upon the color which is desired and the nature of the pigment. Generally the amount incorporated will be within the range 1 to 20% of pigment, based upon the total weight of the flux. The inclusion of any well-known ceramic pigments in accordance with understood procedures to produce colors that are known to result in glazes by the inclusion of these pigments, is within the contemplation of this invention.

In the appended claims the term "lead silicate," or glazes of the lead silicate type, is intended to define my improved glazes which contain lead oxide and silica, with which titanium dioxide is melted-in, and from which boric acid, boric oxide or other boron compounds are absent. These glazes may or may not contain an alkali metal oxide or mixtures of alkali metal oxides.

To those skilled in the art many modifications and widely different embodiments and applications of my invention in the general field of glassware decoration will be readily suggested. The disclosures and descriptions given herein are intended to be illustrative and not restrictive. Since various changes may be made in the compositions, proportions, procedures and details disclosed herein without departing from the spirit of my invention and the scope thereof, it is intended that the invention is to be restricted only as necessitated by the prior art or appended claims.

I claim:

1. A low-melting glaze for decorating glassware consisting principally of lead silicate which possesses the following composition: lead oxide, 55 to 80%; silica, 15 to 35%; titanium dioxide, 2 to 7%, said percentages being by weight, based on the total weight of said glaze.

2. A composition as defined in claim 1 which includes, in addition, an alkali metal oxide in amounts up to 10% by weight based on the weight of said glaze.

3. A composition as defined in claim 1 which contains, in addition, an alkali metal oxide selected from the group which consists of oxides of sodium, potassium and lithium, in amounts up to 10% by weight based on the weight of the glaze.

4. A low-melting lead silicate vitreous glaze suitable for decorating glassware and having a fusing point below about 1100° F. which contains, in addition to the usual opacifying agents and/or ceramic pigments lead oxide, silica, and titanium dioxide.

5. A process for preparing a low-melting vitreous glaze suitable for decorating glassware which comprises melting together, lead oxide in amounts ranging from 55 to 80%, silica in amounts ranging from 15 to 35%, titanium dioxide in amounts ranging from 2 to 7%, and an alkali metal oxide in amounts ranging up to 10%, said amounts being by weight based on the total weight of the batch.

6. A lead frit comprising silica, lead oxide and titanium oxide, the proportion of lead oxide being from 55 to 80% and that of titanium dioxide being from 2 to 7%.

7. A glass object decorated with the glaze of claim 4.

8. A glass object decorated with the lead frit composition of claim 6.

ALDEN J. DEYRUP.